United States Patent
Murata et al.

(10) Patent No.: US 6,810,846 B2
(45) Date of Patent: Nov. 2, 2004

(54) FLOW PATH STRUCTURE OF HOLLOW TUBE

(75) Inventors: Shinichi Murata, Okazaki (JP); Toshihiko Oka, Kyoto (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 0 days.

(21) Appl. No.: 10/338,783

(22) Filed: Jan. 8, 2003

(65) Prior Publication Data

US 2003/0154943 A1 Aug. 21, 2003

(30) Foreign Application Priority Data

Jan. 10, 2002 (JP) ........................................ 2002-003131

(51) Int. Cl.[7] .................................................. F01M 1/06
(52) U.S. Cl. ............................ 123/90.36; 123/196 M; 123/40.16
(58) Field of Search ............................ 123/90.16, 90.36, 123/90.33, 196 R, 196 M (56) References Cited

U.S. PATENT DOCUMENTS

| | | | |
|---|---|---|---|
| 4,615,310 A | * 10/1986 | Umeha et al. | 123/90.34 |
| 5,125,373 A | 6/1992 | Yamada et al. | 123/90.36 |
| 5,476,075 A | * 12/1995 | Doll et al. | 123/90.36 |

FOREIGN PATENT DOCUMENTS

| | | | | |
|---|---|---|---|---|
| GB | 2268547 A | * | 1/1994 | ............ F16N/21/00 |
| JP | 2741844 B2 | | 1/1998 | |
| JP | 2889675 B2 | | 2/1999 | |

* cited by examiner

*Primary Examiner*—Thomas Denion
*Assistant Examiner*—Zelalem Eshete
(74) *Attorney, Agent, or Firm*—Rossi & Associates (57) ABSTRACT

To provide a flow path structure of a hollow tube capable of reducing facility cost and product cost by promoting assembling operability, a rocker shaft is constituted by including a tubular member having a hollow portion and a partitioning member interposed at the hollow portion of the tubular member for partitioning the hollow portion into a plurality of flow paths along an axial direction and the partitioning member is constituted by a plate member including a partitioning portion for partitioning the hollow portion into the flow paths along the axial direction and a close contact portion brought into close contact with an inner face of the tubular member.

11 Claims, 8 Drawing Sheets

FLOW PATH STRUCTURE OF HOLLOW TUBE

BACKGROUND OF THE INVENTION

1. Field of the Invention

The present invention relates to a flow path structure of a hollow tube for partitioning a hollow portion of a tubular member formed with the hollow portion into a plurality of flow paths by a partitioning member.

2. Description of Related Art

In tubes used in various kinds of machines or apparatus, there is a tube which needs a plurality of partitioned flow paths at inside thereof. For example, in a vehicular engine, lubricating oil needs to supply to rotating portions or sliding portions and lubricating oil is made to flow in a hollow portion formed at inside of a rocker shaft in a hollow shape. Further, in an engine having a variable valve driving mechanism in which opening and closing timings, lift amounts and opening time periods of a suction valve and an exhaust valve are changed at low speed and at high speed of the engine, controlling oil for hydraulically controlling the variable valve driving mechanism is made to flow to a hollow portion of a rocker shaft.

In order to form flow paths for making lubricating oil and controlling oil flow to a hollow portion of a rocker shaft in this way, a technology of partitioning a hollow portion of a rocker shaft into two flow paths by a partitioning wall is described in, for example, Japanese Patent No. 2,741,844 and Japanese Patent No. 2,889,675. According to a technology described in the publications, by inserting an inner tube constituting a semicircular sectional shape into an outer tube constituting a circular sectional shape, at inside of the outer tube, a flow path in the inner tube and a flow path between the outer tube and the inner tube are formed.

Meanwhile, when two flow paths are formed at a hollow portion of a rocker shaft, it is necessary to form an oil supply hole and an oil discharge hole at the outer tube and the inner tube. Therefore, when the two flow paths are formed by inserting the inner tube into the outer tube, the outer tube and the inner tube needs to fix at a predetermined inserting position at which the respective holes of the outer tube and the inner tube coincide with each other. In the case of the related art, the inner tube is pressed-fitted into the outer tube to fix at a predetermined position, or the outer tube and the inner tube are fixed by carrying out drawing operation after insertion. However, since the respective tubes are highly rigid, operation of press-fitting or fixing the position is difficult and when the rocker shaft is long, the operability is poor. Meanwhile, the drawing operation after insertion poses a problem of bringing about a deterioration in the operability or an increase in facility cost and product cost. Further, when the oil supply hole and the oil discharge hole are formed beforehand at the outer tube and the inner tube, operation of fitting the two members may be hampered by producing burr at the inner peripheral face, particularly, it is difficult to remove burr formed at the inner peripheral face of the inner tube and there also is a concern of mixing burr in oil after assembling to hamper operation of the engine.

The invention is for resolving such problems and it is an object thereof to provide a flow path structure of a hollow tube capable of reducing facility cost and product cost by promoting assembling operability.

SUMMARY OF THE INVENTION

In order to achieve the above-described object, according to an aspect of the invention, there is provided a flow path structure of a hollow tube comprising a tubular member formed with a hollow portion at inside thereof, and a partitioning member interposed at the hollow portion of the tubular member for partitioning the hollow portion into a plurality of flow paths along an axial direction of the tubular member, wherein the partitioning member comprises a plate member including a partitioning portion for partitioning the hollow portion into the plurality of flow paths along the axial direction, and a close contact portion extended from the partitioning portion and brought into close contact with an inner face of the tubular member for constituting the hollow portion.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

An embodiment of a flow path structure of a hollow tube embodying the invention will be explained as follows.

According to the embodiment, a flow path structure of a hollow tube according to the invention is applied to a rocker shaft of a vehicular engine mounted with a variable valve driving mechanism.

As shown by FIG. 1 through FIG. 5, a rocker shaft 11 according to the embodiment comprises a tubular member 12 having a predetermined length formed with a hollow portion at inside thereof, a partitioning plate 13 inserted into the hollow portion of the tubular member 12 along an axial direction for constituting a partitioning member for partitioning the hollow portion into two oil paths (flow paths) A, B along the axial direction and a lid 14 mounted to a shaft end portion of the tubular member 12.

Figure 1:
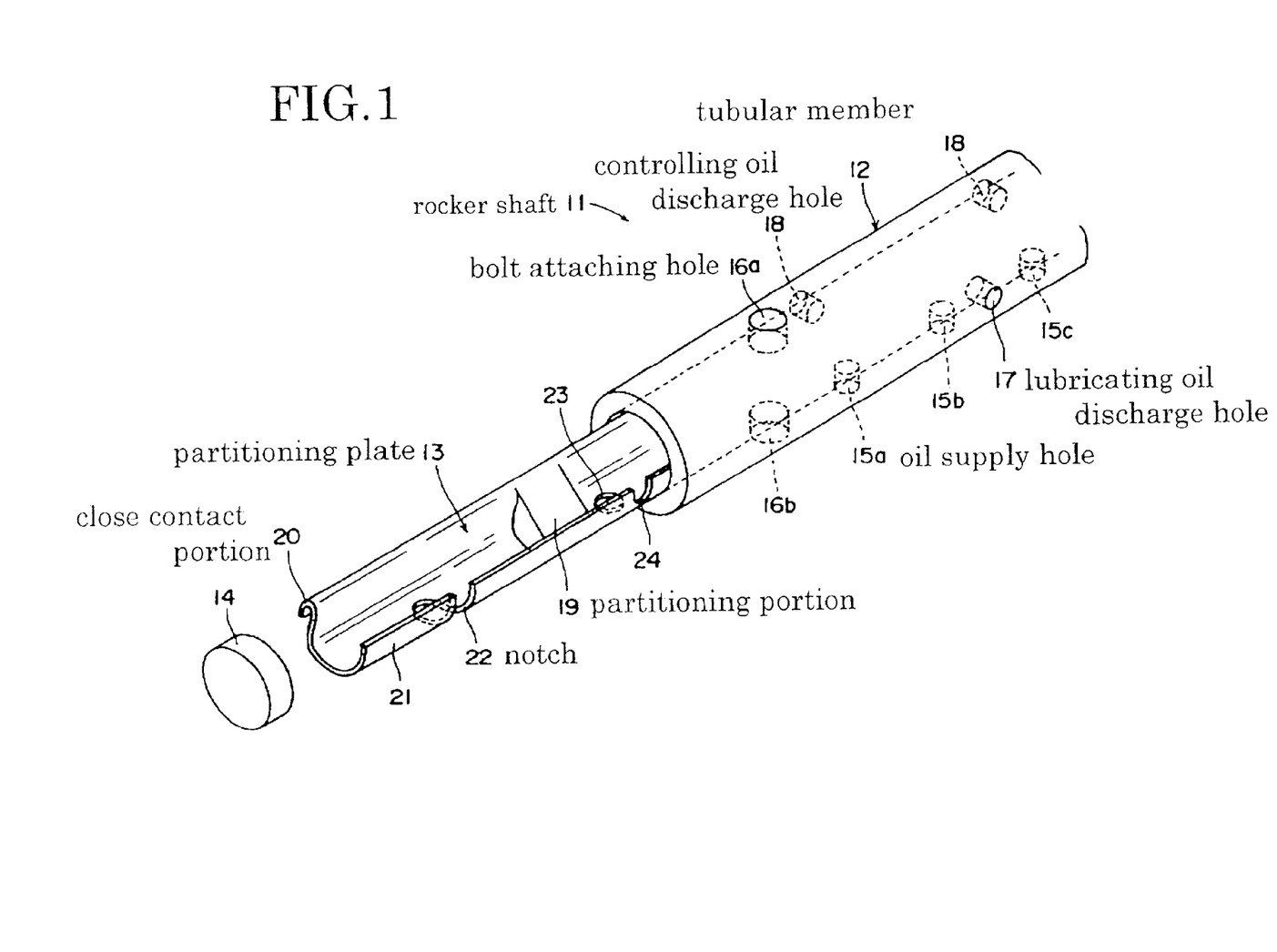
FIG. 1 is an outline view of a rocker shaft constituting a tubular member according to an embodiment of the invention.

The tubular member 12 is constituted by a cylindrical shape and a lower portion thereof is formed with a plurality of oil supply holes 15a, 15b, 15c . . . constituting fluid holes to align at the positions along the axial direction. Further, whereas one side portion of the tubular member 12 is formed with a lubricating oil discharge hole 17 constituting a fluid hole at a predetermined portion in the axial direction, other side portion thereof is formed with a controlling oil discharge hole 18 constituting a fluid hole at a predetermined portion in the axial direction. According to the tubular member 12, an outer periphery thereof and the hollow portion are communicated by the fluid holes. Further, the tubular member 12 is formed with a pair of upper and lower bolt attaching holes 16a, 16b constituting inserting holes at a predetermined interval therebetween.

Meanwhile, the partitioning plate 13 is formed by a spring member of a spring steel plate or a stainless steel plate, having predetermined elastic force and constituting a length in the axial direction substantially similar to that of the tubular member 12. The partitioning plate 13 includes a partitioning portion 19 a section of which is formed substantially in an S or Z-like shape and which partitions the hollow portion of the tubular member 12 into two parallel flow paths (the lubricating oil path A constituting a first flow path, the controlling oil path B constituting a second flow path) along the axial direction, and close contact portions 20, 21 extended from one side portion (one end portion in a width direction) and other side portion (other end portion in the width direction) of the partitioning portion 19 along an inner face of the tubular member 12 and brought into close contact with the inner face. The partitioning plate 13 is constituted by a sectional shape which differs in a longitudinal direction thereof.

Figure 2:
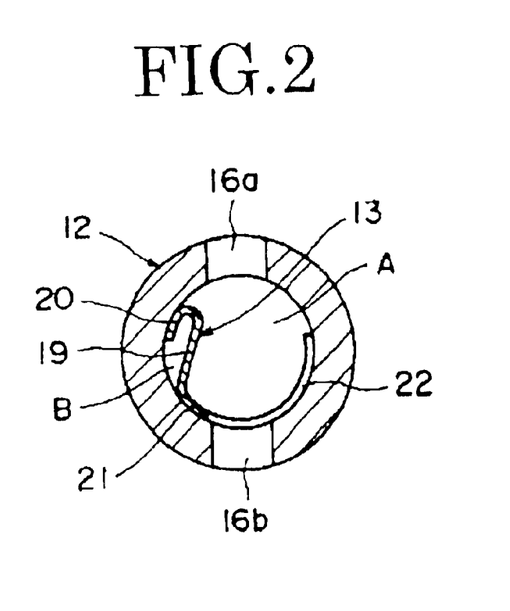
FIG. 2 is a sectional view of the rocker shaft at an attaching portion attached by a bolt.

That is, as shown by FIG. 1 and FIG. 2, at a position in the axial direction in correspondence with the bolt attaching holes 16a, 16b of the partitioning plate 13, the partitioning portion 19 is formed to be short to keep out of a bolt inserted through the tubular member 12 and the close contact portion 21 is formed to be long to be brought into close contact with the inner face of the lower portion of the tubular member 12. Further, the close contact portion 21 is formed with a notch 22 constituting an inserting portion for inserting the bolt in correspondence with the bolt attaching hole 16b and a width of the notch 22 is formed to be larger than a diameter of the bolt attaching hole 16b.

Figure 3:
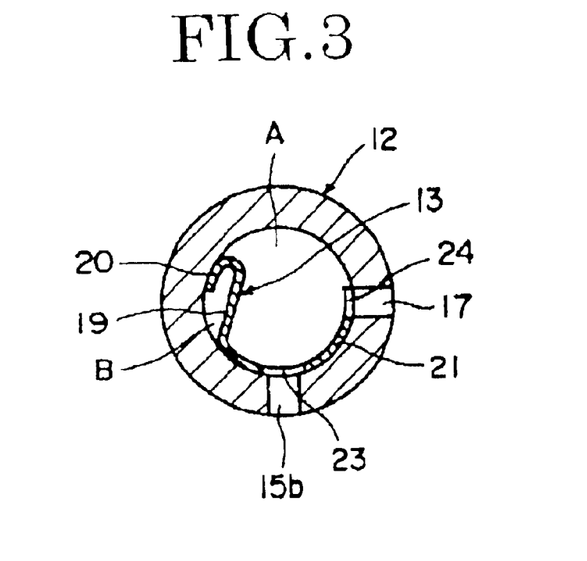
FIG. 3 is a sectional view of the rocker shaft at a supply hole and a discharge hole of lubricating oil.

Further, as shown by FIG. 1 and FIG. 3, at a position in correspondence with the oil supply hole 15b and the lubricating oil discharge hole 17 of the tubular member 12, the partitioning plate 13 is formed in a sectional shape substantially similar to that at the position in correspondence with the bolt attaching holes 16a, 16b, the close contact portion 21 is formed with an oil supply hole 23 in correspondence with the oil supply hole 15b to constitute a communicating portion more or less larger than the oil supply hole 15b and formed with an oil discharge hole (notch) 24 constituting a communicating portion in correspondence with the lubricating oil discharge hole 17. Therefore, the lubricating oil path A is communicated with the oil supply holes 15b, 23 and communicated with the lubricating oil discharge holes 17, 24.

Figure 4:
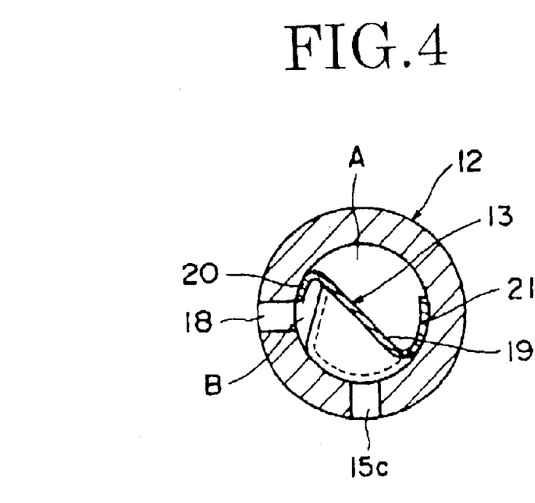
FIG. 4 is a sectional view of the rocker shaft at a supply hole and a discharge hole of controlling oil.
Figure 5:
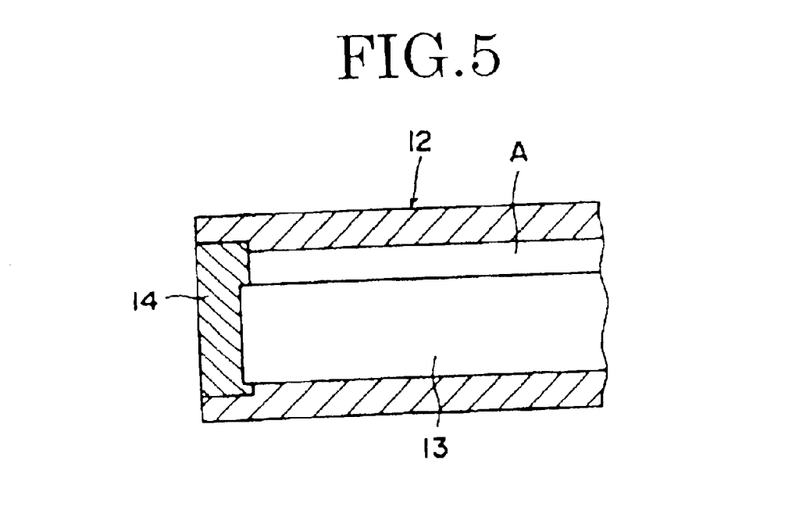
FIG. 5 is a sectional view of an end portion of the rocker shaft.

Further, according to the partitioning plate 13, as shown by FIG. 1 and FIG. 4, at a position in correspondence with the oil supply holes 15a, 15c and the controlling oil discharge hole 18 of the tubular member 12, the partitioning portion 19 is formed to be long to pass a central position of the tubular member 12 and the close contact portions 20, 21 are formed substantially by the same length to be brought into close contact with the inner peripheral face of the tubular member 12. Therefore, the controlling oil path B is communicated with the oil supply holes 15a, 15c and communicated with the controlling oil discharge hole 18. Further, as shown by FIG. 1 and FIG. 5, at the position of the shaft end portion, the partitioning plate 13 is formed by a sectional shape substantially similar to that at the position in correspondence with the bolt attaching holes 16a, 16b. Further, the tubular member 12 is fitted with the lid 14 at the shaft end portion of the hollow portion and the lid 14 is brought is close contact with an end face of the partitioning portion 19. Therefore, the lubricating oil path A and the controlling oil path B are partitioned without joining together since end portions thereof in the axial direction are closed by the lid 14.

Figure 6:
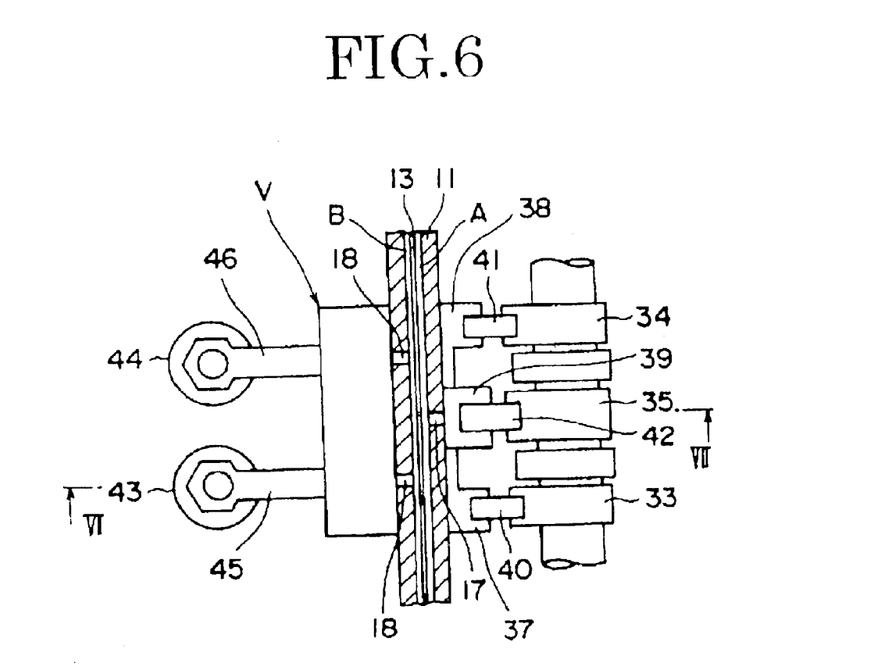
FIG. 6 is a plane view of an essential portion of an engine showing a variable valve driving mechanism using the rocker shaft according to the embodiment.
Figure 7:
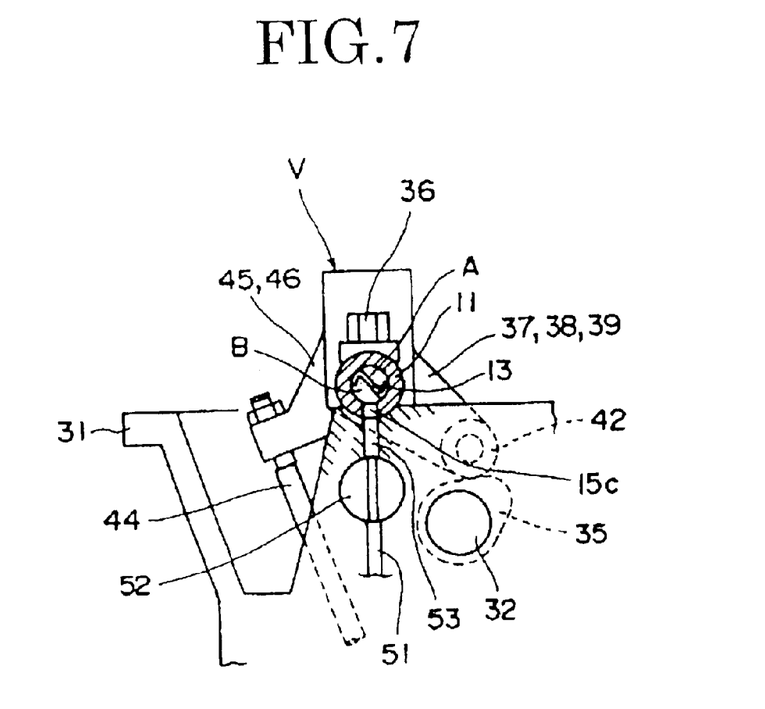
FIG. 7 is a sectional view taken along a line VII—VII of FIG. 6.

The rocker shaft 11 of the embodiment constituted in this way is assembled to an upper portion of a vehicular engine having a variable valve driving mechanism. That is, as shown by FIG. 6 and FIG. 7, a cam shaft 32 is rotatably supported by a central portion of a cylinder head 31 and cams 33, 34 for low speed and a cam 35 for high speed are formed integrally therewith. Further, a cam shaft sprocket, not illustrated, is fixedly connected to one end of the cam shaft 32, a timing belt is hung around between the cam shaft sprocket and a crankshaft sprocket and the cam shaft 32 can be rotated in synchronism with the crankshaft sprocket.

Further, the above-described suction rocker shaft 11 and an exhaust rocker shaft (not illustrated) are arranged at the cylinder head 31 in parallel with each other on both sides of the cam shaft 32 and fixed to the cylinder head 31 by a fixing bolt 36. Rocker arms 37, 38 for low speed and a rocker arm 39 for high speed are rotatably supported by the rocker shaft 11. Further, roller bearings 40, 41, 42 are attached to base end portions of the respective rocker arms 37, 38, 39 and opposed to the low speed cams 33, 34 and the high speed cam 35. Further, arms 45, 46 are extended from the variable valve driving mechanism V and front end portions thereof are opposed to upper end portions of suction valves 43, 44.

According to the engine, rocking of either of the low speed rocker arms 37, 38 and the high speed rocker arm 39 is transmitted to the arms 45, 46 via the variable valve driving mechanism V to thereby drive the suction valves 43, 44. That is, the suction valves 43, 44 are switched to drive by the variable valve driving mechanism V to be opened or closed based on a profile of either of the low speed cams 33, 34 or the high speed cam 35. The variable valve driving mechanism V is driven by hydraulic pressure and is publicly known in the related art and therefore, a detailed explanation thereof will be omitted here.

Further, the cylinder head 31 is formed with an oil supply path 51 connected to an oil pump and the oil supply path 51 is connected to the respective oil supply holes 15a, 15c formed at the lower portion of the rocker shaft 11 via an oil control valve 52 and an oil supply path 53. Further, the oil supply path 51 is directly connected to the oil supply hole 15b. Therefore, the lubricating oil can be supplied from the oil supply holes 15b, 23 constituting first fluid supply holes to the lubricating oil path A and can be supplied from the lubricating oil path A to predetermined engine operating portions via the lubricating oil discharge holes 17, 24. Further, controlling oil pressure of which is controlled by the oil control valve 52 can be supplied from the oil supply holes 15a, 15c constituting second fluid supply holes to the controlling oil path B and can be supplied from the controlling oil path B to the variable valve driving mechanism V via the controlling oil discharge hole 18.

In this way, according to the embodiment, the rocker shaft 11 comprises the tubular member 12 having the predetermined length and the partitioning plate 13 having the section in the S-like shape inserted into the hollow portion of the tubular member 12 along the axial direction for partitioning the hollow portion into two of the oil paths A, B along the axial direction. Therefore, by only inserting the partitioning plate 13 into the hollow portion of the tubular member 12, the hollow portion can easily be partitioned into two of the oil paths A, B along the axial direction. In this case, the partitioning plate 13 is constituted by the spring member and therefore, provided with elastic force and can easily be inserted thereinto without using large force and positioning of the bolt attaching holes 16a, 16b with the notch 22 and positioning of the oil supply holes 15b, 23 and the oil discharge holes 17, 24 can easily be carried out.

Further, the hollow portion of the tubular member 12 is partitioned by the partitioning portion 19 of the partitioning plate 13 and sealed by bringing the close contact portions 20, 21 into close contact with an inner peripheral face thereof and therefore, firmly partitioned into two of the oil paths A, B and in comparison with the constitution of forming a plurality of paths by fitting large and small tubes, the assembling operability can be promoted by facilitating inserting operation and positioning operation, further, the fabricating cost can be reduced. Further, the product cost can be reduced by facilitating to fabricate the partitioning plate 13.

Further, by making the notch 22, the oil supply hole 23 and the oil discharge hole 24 of the partitioning plate 13 larger than the bolt attaching holes 16a, 16b, the oil supply hole 16b and the oil discharge hole 17 of the tubular member 12, fabrication cost can be reduced with no need of requesting high fabrication accuracy. Further, it is not necessary to position the partitioning member 13 relative to the tubular member 12 with high accuracy and operational cost can be reduced.

Further, although according to the above-described embodiment, the notch 22 and the oil discharge hole (notch) 24 are formed at the partitioning plate 13 in correspondence with the bolt attaching holes 16a, 16b and the oil discharge hole 17 of the tubular member 12, holes may be constituted therefor.

Figure 8:
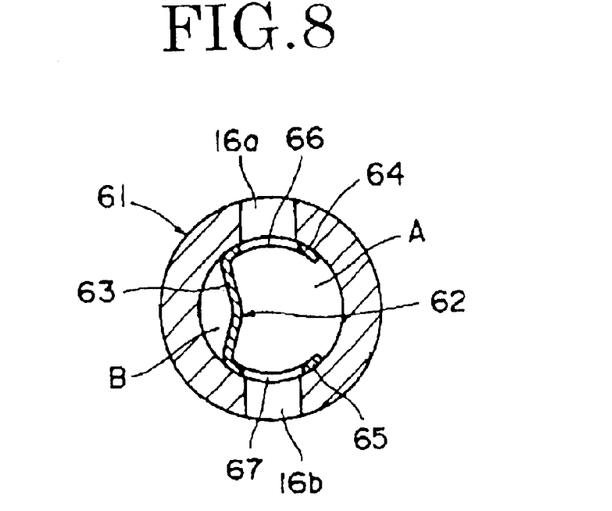
FIG. 8 is a sectional view of a rocker shaft constituting a tubular member according to a second embodiment of the invention at an attaching portion thereof attached by a bolt.
Figure 9:
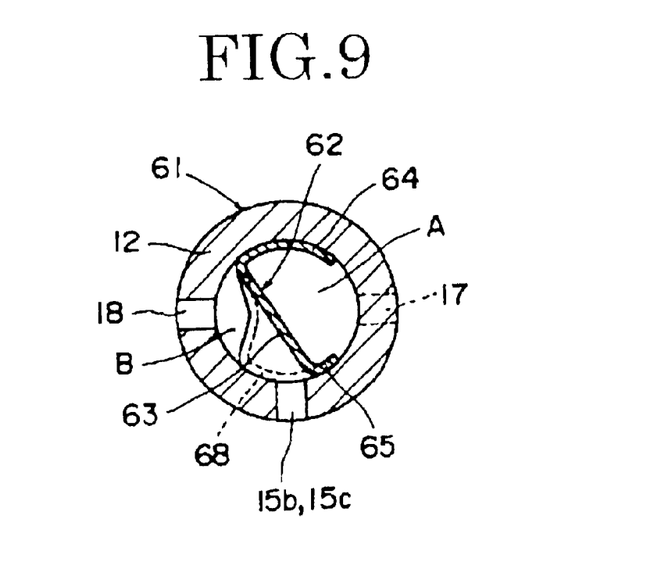
FIG. 9 is a sectional view of the rocker shaft at a supply hole and a discharge hole of controlling oil.
Figure 10:
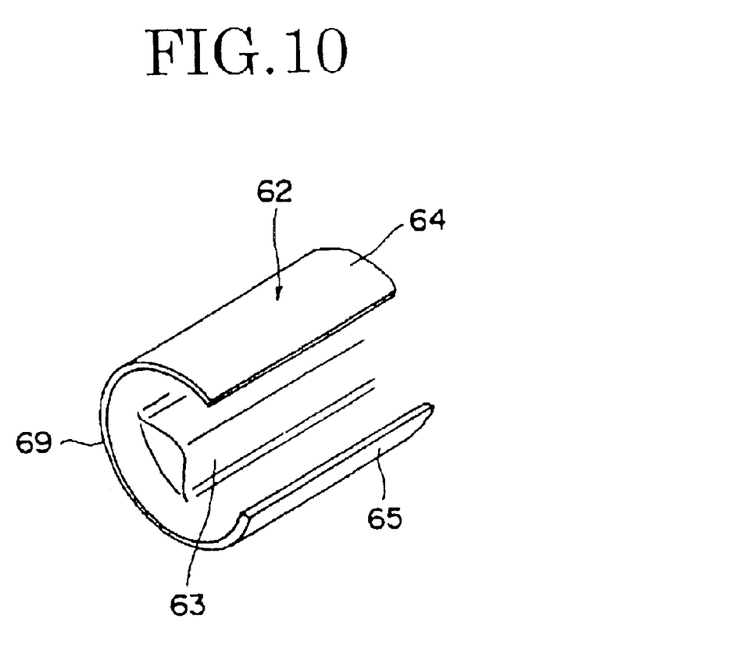
FIG. 10 is an outline view of an end portion of a partitioning member.
Figure 11:
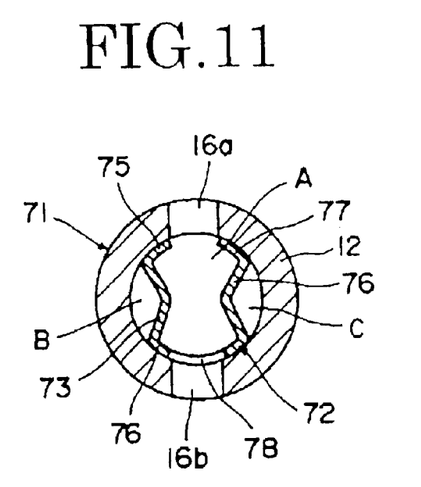
FIG. 11 is a sectional view of a rocker shaft constituting a tubular member according to a third embodiment of the invention at an attaching portion thereof attached by a bolt.

FIG. 8 shows a section of a rocker shaft constituting a tube having a partitioning wall according to a second embodiment of the invention at an attaching portion thereof attached by a bolt, FIG. 9 shows a section of the rocker shaft at a supply hole and a discharge hole of controlling oil, FIG. 10 shows an outline of an end portion of a partitioning member and FIG. 11 shows a section of a rocker shaft constituting a tube having a partitioning wall according to a third embodiment of the invention at an attaching portion thereof attached by a bolt. Further, the same notations are attached to members having functions similar to those explained in the above-described embodiment and a duplicated explanation thereof will be omitted.

According to the second embodiment, as shown by FIG. 8 through FIG. 10, a rocker shaft 61 comprises the tubular member 12 and a partitioning plate 62 inserted into the hollow portion of the tubular member 12 for partitioning the hollow portion into two of the oil paths (flow paths) A, B and a lid (not illustrated).

The partitioning plate 62 is formed by a spring member and is provided with predetermined elastic force, a section thereof is formed substantially in a C (E)-like shape and the partitioning plate 62 includes a partitioning portion 63 for partitioning the hollow portion of the tubular member 12 into two parallel flow paths (lubricating oil path A, controlling oil path B) along the axial direction and close contact portions 64, 65 extended from two side portions (two end portions in a width direction) of the partitioning portion 63 and brought into close contact with the inner peripheral face of the tubular member 12. The partitioning plate 62 is constituted by a sectional shape which differs in a longitudinal direction thereof.

That is, as shown by FIG. 8 in details, at a position of the partitioning plate 62 for attaching the bolt, the partitioning portion 63 is formed to be short to keep out of the bolt, the close contact portions 64, 65 are brought into close contact with the inner peripheral face at an upper portion and a lower portion of the tubular member 12 and formed with bolt inserting holes 66, 67 more or less larger than the bolt attaching hole 16b in corresponding therewith. Further, as shown by FIG. 9 in details by broken lines, at a position of the partitioning plate 62 for supplying and discharging lubricating oil, the partitioning plate 62 is constituted by a sectional shape substantially similar to that at the position of attaching the bolt and the close contact portion 67 is formed with an oil supply hole 68 in correspondence with the oil supply hole 15b. Further, as shown by FIG. 9 in details by bold lines, at a position of the partitioning plate 62 for supplying and discharging controlling oil, the partitioning plate 62 is formed to be long to pass substantially a central position of the hollow portion of the tubular member 12 and the contact portions 66, 67 are brought into close contact with the inner face of an upper portion of the tubular member 12 and an inner face of the lower portion thereof.

Therefore, the lubricating oil path A is communicated with the oil supply holes 15b, 68 and communicated with the lubricating oil discharge hole 17 and the controlling oil path B is communicated with the oil supply holes 15a, 15c and communicated with the controlling oil discharge hole 18.

Further, as shown by FIG. 10 in details, at a position of a shaft end portion of the partitioning plate 62, the partitioning plate 62 is constituted by a C-like shape in a section thereof such that the partitioning portion 63 is brought into close contact with the inner peripheral face of the tubular member 12 similar to the close contact portions 64, 65 and the shaft end portion is formed with a closing portion 69 for closing the controlling oil path B. Further, a lid, not illustrated, is fitted to the end portion of the tubular member 12. Therefore, the lubricating oil path A and the controlling oil path B are partitioned without joining together.

In this way, according to the embodiment, the rocker shaft 11 comprises the tubular member 12 having the predetermined length and the partitioning plate 62 inserted into the hollow portion of the tubular member 12 along the axial direction and having the C-like shape for partitioning the hollow portion into two of the oil paths A, B along the axial direction. Therefore, by only inserting the partitioning plate 62 into the hollow portion of the tubular member 12, the two oil paths A, B along the axial direction can easily be partitioned at inside thereof. In this case, since the partitioning plate 62 is constituted by the spring member having the section in the C-like shape, the partitioning plate 62 can easily be inserted by contracting a diameter thereof and positioning thereof can easily be carried out.

Further, when the tubular member 12 is previously formed with the bolt attaching holes 16a, 16b and the oil supply holes 15a, 15c, the partition plate 62 is formed with the notch 22 and the oil supply hole 23 and thereafter, the partitioning plate 62 is inserted into the tubular member 12, since the partitioning plate 62 is formed by a plate-like shape, deburring in forming the holes can be carried out extremely easily and deburring operation in inserting the partitioning plate 62 into the tubular member 12 can be dispensed with.

Further, by forming the closing portion 69 for closing the controlling oil path B at the shaft end portion of the partitioning plate 62, the structure of the lid attached to the end portion of the tubular member 12 can be simplified and the fabrication cost can be reduced.

According to the third embodiment, as shown by FIG. 11, a rocker shaft 71 comprises the tubular member 12, a partitioning plate 72 inserted into the hollow portion of the tubular member 12 for partitioning the hollow portion into three of oil paths (flow paths) A, B, C and a lid (not illustrated). The partitioning plate 72 is formed by a spring member and is provided with predetermined elastic force, a section thereof is formed substantially in a C-like shape having recessed portions, the partitioning plate 72 includes partitioning portions 73, 74 for partitioning the hollow portion of the tubular member 12 into three of the flow paths A, B, C in parallel with each other along the axial direction and close contact portions 75, 76, 77 extended from two side portions (two end portions in a width direction) of the partitioning portions 73, 74 and brought into close contact with the inner peripheral face of the tubular member 12 and formed with a bolt inserting hole 78 in correspondence with the bolt attaching hole 16b. Although not illustrated, oil can be charged to and discharged from the respective flow paths A, B, C.

In this way, according to the embodiment, by devising the shape of the partitioning plate 72, three of the flow paths A, B, C can easily be partitioned in the hollow portion of the tubular member 12 and a number of the partition may be four or more.

Further, although according to the above-described embodiments, the tube having the partitioning wall according to the invention is applied to the rocker shaft, the tube is applicable to a pass of transporting a fluid regardless of the cam shaft or the engine.

As described above, the flow path structure of the hollow tube according to the embodiments includes the tubular member formed with the hollow portion at inside thereof and the partitioning member interposed at the hollow portion of the tubular member for partitioning the hollow portion into the plurality of flow paths along the axial direction of the tubular member and the partitioning member comprises the plate member including the partitioning portion for partitioning the hollow portion into the plurality of flow paths along the axial direction and the close contact portion extended from the partitioning portion and brought into close contact with the inner face of the tubular member forming the hollow portion and therefore, in comparison with the constitution of forming a plurality of flow paths by fitting large and small tubes, the assembling operability can be promoted by facilitating inserting operation and positioning operation, the facility cost can be reduced, further, the product cost can be reduced by facilitating to fabricate the partitioning plate.

Further, since the partitioning member is formed in the S-like shape in the section or the C-like shape in the section, the partitioning portion and the close contact portion can easily be formed by the section in the S-like shape or the section in the C-like shape, and when the hollow portion of the tubular portion is partitioned into the plurality of flow paths by the partitioning member, sealing performance of the flow paths can easily be ensured.

Further, since the partitioning member is formed by the spring member and the close contact portion is brought into close contact with the inner face of the hollow portion by being elastically pressed, the partitioning member can easily be inserted into the hollow portion of the tubular member and reliability of sealing the flow paths can be promoted by firmly bringing the close contact portion into contact with the inner face of the hollow portion after insertion.

Further, since the partitioning member includes the closing portion for closing one flow path of the plurality of flow paths in the axial direction, when the lid for closing the hollow portion is mounted to the shaft end portion of the tubular member, the closing portion of the partitioning member closes the one flow path and therefore, the lid may be for closing the other flow path by fitting with the hollow portion and therefore, low cost formation can be achieved by simplifying the structure of the lid and the sealing performance can be promoted.

Further, whereas the tubular member is formed with the attaching hole for inserting the bolt, the close contact portion of the partitioning member is formed with the notch for inserting the bolt and therefore, when the inserting hole of the bolt for fixing the tube is formed, since the notch is formed at the close contact portion of the partitioning plate, the fabrication cost can be reduced by dispensing with notching with high accuracy.

Further, whereas the tubular member is formed with the fluid supply hole and the fluid discharge hole in correspondence with the plurality of flow paths, the close contact portion of the partitioning member is formed with the fluid supply hole and the fluid discharge hole in correspondence with at least one of the flow paths, the fluid supply hole and the fluid discharge hole of the partitioning plate is formed to be larger than the fluid supply hole and the fluid discharge hole of the tubular member and therefore, when the tube is formed with the fluid supply hole and the fluid discharge hole, since the close contact portion of the partitioning plate is formed with the fluid supply hole and the fluid discharge hole, the fabrication cost can be reduced by dispensing with fabrication with high accuracy.

Further, since the tubular member is constituted by the rocker shaft attached to the upper portion of the cylinder head and the oil can be supplied from the side of the cylinder head to the plurality of flow paths via the oil supply hole formed at the lower portion of the rocker shaft, the oil can firmly be supplied to the plurality of flow paths provided at the rocker shaft.

Further, by providing the plurality of oil supply holes along the axial direction of the tubular member in parallel with each other and constituting the sectional shape of the partitioning member which differs by the position which differs in the axial direction, the respective oil supply hole can be communicated to the respective oil path and therefore, the oil can firmly be supplied to the plurality of flow paths provided at the rocker shaft from one direction and a number of steps of fabricating the oil supply holes can be reduced.

Further, since the tubular member is constituted by the rocker shaft attached to the upper portion of the cylinder head and the plurality of flow paths provided at the rocker shaft are constituted by the oil path for lubricating oil and the oil path for controlling oil of the variable valve driving mechanism, smooth operation of the engine can be guaranteed by firmly supplying the lubricating oil to the engine operating portions and firmly controlling the opening and closing timings of the respective valves by firmly supplying the controlling oil at predetermined pressure to the variable valve driving mechanism.

Further, according to the method of fabricating the flow path structure of the hollow tube by the embodiments, after forming the attaching holes of the bolt, the notches, the fluid supply holes and the fluid discharge holes to respectives of the tubular member and the partitioning member, the partitioning member is inserted into the tubular member and therefore, in comparison with the related art in which it is difficult to deburr the inner face of the inner tube by inserting the inner tube to the outer tube, deburring in forming the holes of the partitioning member can extremely easily be carried out, further, deburring in inserting the partitioning member into the tubular member can be dispensed with.

What is claimed is:

1. A flow path structure of a hollow tube comprising:

a tubular member formed with a hollow portion at inside thereof and a hole extending from an outer periphery of the tubular member into the hollow portion; and a partitioning plate member interposed at the hollow portion of the tubular member for partitioning the hollow portion into at least a first flow path and a second flow path along an axial direction of the tubular member;

wherein the partitioning plate member includes:

a partitioning portion for partitioning the hollow portion into the first and second flow paths along the axial direction; and a close contact portion extending from the partitioning portion and closely contacting an inner face of the tubular member to form the first and second flow paths, and the close contact portion is elastically pressed to the inner face of the tubular member while avoiding overlapping with the hole, and wherein the partitioning plate member has a pair of free edges that extend along an axial direction of the tubular member.

2. The flow path structure of a hollow tube according to claim 1, wherein the close contact portion includes one side portion and another side portion extending from the partitioning portion along the inner face and contacting the inner face of the tubular member.

3. The flow path structure of a hollow tube according to claim 1, wherein a section of the partitioning plate member in view from the axial direction has a substantially S-shape or C-shape.

4. The flow path structure of a hollow tube according to claim 1, wherein the partitioning plate member comprises a spring member and the close contact portion is brought into close contact with the inner face by being elastically pressed.

5. The flow path structure of a hollow tube according to claim 1, wherein the partitioning plate member includes a closing portion for closing one of the first and second flow paths in the axial direction.

6. The flow path structure of a hollow tube according to claim 1, wherein the tubular member is formed with a fluid hole for supplying a fluid to the flow path partitioned by the partitioning plate member or discharging the fluid from the flow path to communicate an outer periphery thereof and the hollow portion; and wherein the close contact portion of the partitioning plate member is formed with a communicating portion formed larger than the fluid hole at a position thereof in correspondence with the fluid hole for communicating the fluid hole and the hollow portion.

7. The flow path structure of a hollow tube according to claim 1, wherein the tubular member is a rocker shaft attached to a cylinder head of an engine and an oil is supplied from the cylinder head to the first and second flow paths.

8. The flow path structure of a hollow tube according to claim 1, wherein the tubular member is attached to a cylinder head having a variable valve driving mechanism operated by a hydraulic pressure of the supplied oil; and wherein the first and second flow paths are an oil path of a lubricating oil and an oil path of an oil supplied to the variable valve driving mechanism.

9. A flow path structure of a hollow tube comprising:

a tubular member formed with a hallow portion at inside thereof and an inserting hole of a bolt inserted into the tubular member by passing the hollow portion; and a partitioning member interposed at the hollow portion of the tubular member for partitioning the hollow portion into a plurality of flow paths along an axial direction of the tubular member, wherein the partitioning member comprises a plate member including:

a partitioning portion for partitioning the hollow portion into the plurality of flow paths along the axial direction; and a close contact portion extending from the partitioning portion and closely contacting an inner face of the tubular member for constituting the hollow portion, wherein the close contact portion of the partitioning member is formed with an inserting portion for inserting the bolt at a position thereof in correspondence with the inserting hole.

10. A flow path structure of a hollow tube comprising:

a tubular member formed with a hollow portion at inside thereof; and a partitioning member interposed at the hollow portion of the tubular member for partitioning the hollow portion into at least a first flow path and a second flow path along an axial direction of the tubular member, wherein the tubular member is formed with a first fluid supply hole for supplying a fluid to the first flow path and a second fluid supply hole for supplying a fluid to the second flow path to communicate an outer periphery of the tubular member with the hollow portion in parallel with the axial direction, wherein the partitioning member comprises a plate member including:

a partitioning portion for partitioning the hollow portion into at least the first and second flow paths along the axial direction, wherein the partitioning member is formed such that a sectional shape thereof at a position in the axial direction in correspondence with the first fluid supply hole and a sectional shape at a position in the axial direction in correspondence with the second fluid supply hole differ from each other to thereby supply the fluid to the first flow path via the first fluid supply path and supply fluid to the second flow path via the second fluid supply path; and a close contact portion extending from the partitioning portion and closely contacting an inner face of the tubular member constituting the hollow portion.

11. A flow path structure of a hollow tube comprising:

a tubular member formed with a hollow portion at inside thereof; and a partitioning member interposed at the hollow portion of the tubular member for partitioning the hollow portion into a plurality of flow paths along an axial direction of the tubular member;

wherein the partitioning member comprises a plate member including:

a partitioning member for partitioning the hollow portion into the plurality of flow paths along the axial direction; and a close contact portion extending from the partitioning portion and closely contacting an inner face of the tubular member for forming the hollow portion; and wherein the tubular member is formed with at least one of an inserting hole for a bolt insertable by passing the hollow portion and a fluid hole for communicating an outer periphery thereof and the hollow portion for supplying a fluid to the flow path partitioned by the partitioning member or discharging the fluid from the flow path;

wherein the close contact portion of the partitioning plate is formed with an inserting portion formed at a position thereof in correspondence with the respective inserting hole for inserting the bolt or a communicating portion formed at a position thereof in correspondence with the fluid hole for communicating the fluid hole and the hollow portion; and wherein said flow path structure of a hollow tube is fabricated by inserting the partitioning member into the hollow portion of the tubular member such that the close contact portion of the partitioning member is elastically pressed by the inner face of the tubular member and the inserting hole of the tubular member coincides with the inserting portion of the close contact portion or the fluid hole of the tubular member coincide with the communicating portion of the close contact portion.

* * * * *